Figure 1:
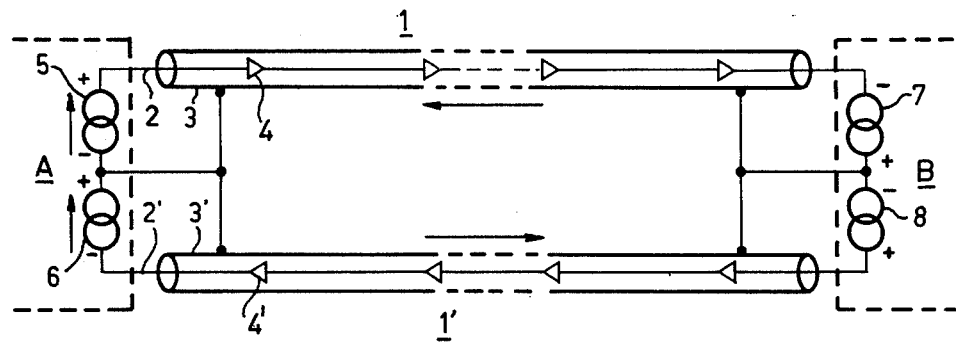

United States Patent [19]

Duimelaar

[11] 4,024,356
[45] May 17, 1977

[54] TRANSMISSION SYSTEM WITH BALANCED BRIDGE TO PREVENT LOW FREQUENCY CROSS TALK

[75] Inventor: Jasper Hendrik Duimelaar, Hilversum, Netherlands

[73] Assignee: U.S. Philips Corporation, New York, N.Y.

[22] Filed: Oct. 2, 1975

[21] Appl. No.: 619,062

[30] Foreign Application Priority Data

Oct. 14, 1974  Netherlands .................... 7413451

[52] U.S. Cl. .......................... 179/170 J; 179/170 R
[51] Int. Cl.² ........................................ H04B 3/44
[58] Field of Search ........ 174/70 S; 179/1 P, 2.5 R, 179/170 R, 170 C, 170 J, 170 E; 333/84 L; 325/472

[56] References Cited

UNITED STATES PATENTS

| | | | |
|---|---|---|---|
| 2,037,183 | 4/1936 | Strieby | 179/170 J |
| 3,535,474 | 10/1970 | Duimelaar | 179/170 J |
| 3,868,484 | 2/1975 | Bolton et al. | 179/170 J |

Primary Examiner—Kathleen H. Claffy
Assistant Examiner—Randall P. Myers
Attorney, Agent, or Firm—Frank R. Trifari; Henry I. Steckler

[57] ABSTRACT

Transmission system for transmitting signals modulating a carrier between two main stations via parallel coaxial lines the inner conductors and the non-earthed outer conductors of which are connected to the earthed main stations via capacitors. The main stations contain low-frequency signal sources which in parallel with direct-current supply sources are connected to the supply current loop for the repeaters included in the coaxial lines. The low-frequency cross-talk due to the low-frequency signals is suppressed by means of compensating circuits.

3 Claims, 4 Drawing Figures

TRANSMISSION SYSTEM WITH BALANCED BRIDGE TO PREVENT LOW FREQUENCY CROSS TALK

The invention relates to a transmission system for transmitting signals modulating a carrier between two earthed main stations via a plurality of coaxial lines the interconnected outer conductors of which are isolated from earth whilst the inner and outer conductors of each of these floating coaxial lines are each connected via a capacitor to the earthed main stations, each of the coaxial lines including repeaters, whilst each of the main stations contains a direct-current supply source for supplying the repeaters included in a coaxial line, which source is connected via a high-frequency stop filter to a supply loop having a go branch and a return branch in the form of the inner conductor and the outer conductor respectively of the relevant coaxial line, each of the main stations further including a plurality of low-frequency signal sources.

Transmission systems of the above-mentioned type are known and have the advantage that with properly selected polarities of the supply current sources connected to the coaxial lines, the direct-current supply of the repeaters included in the coaxial lines can be realised in a particularly economical and reliable manner whilst moreover the occurrence of interference voltages owing to high-voltage power-transmission line networks can be considerably reduced, because the outer conductors of the coaxial lines are not earthed.

It is an object of the present invention to provide a communication system of the aforementioned type which, whilst retaining the aforementioned advantages inherent in such a system, also permits the transmission of the low-frequency signals supplied by the said low-frequency signal sources, such as the signals required for control, supervision, regulation and the like, in a simple and inexpensive manner.

According to the invention such a system is characterized in that the low-frequency signal sources provided in each of the main stations are connected to a supply current loop constituted by the inner and outer conductors of a coaxial line via connecting means which suppress the low-frequency cross-talk due to the transmission of the low-frequency signals.

Figure 2:
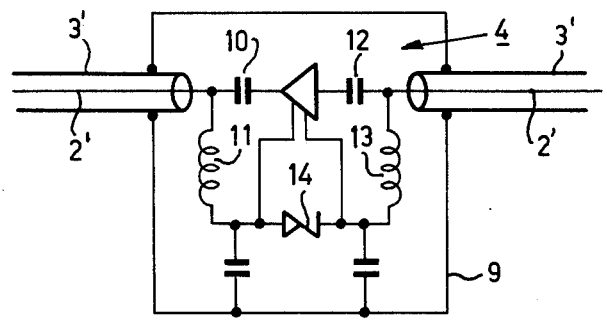
Figure 4:
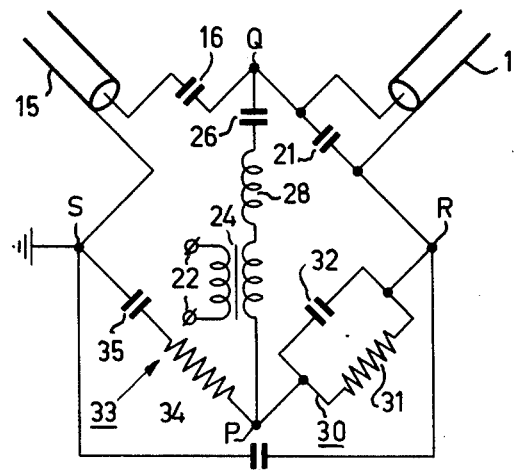
Figure 3:
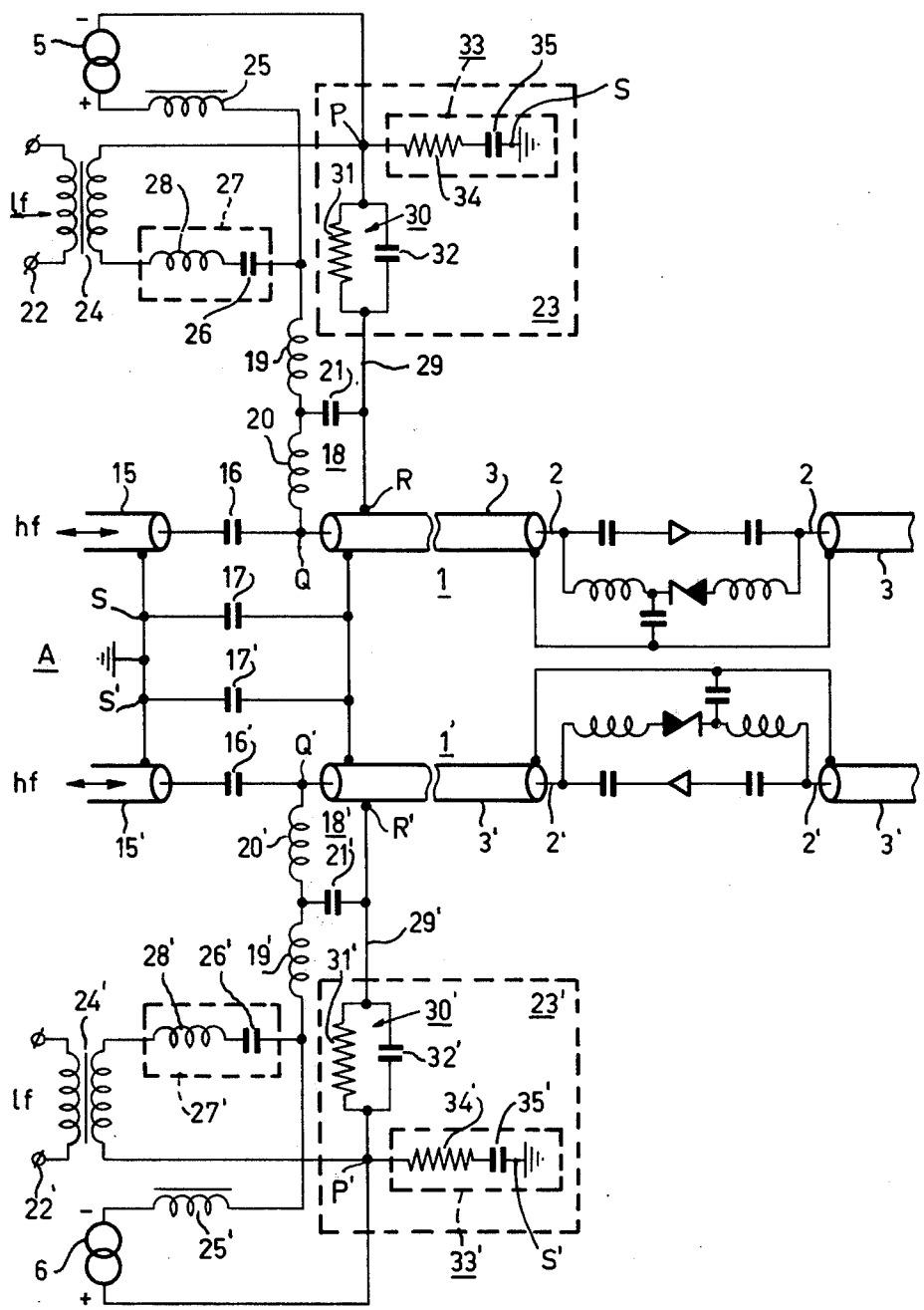

The invention and its advantages will now be described more fully with reference to the accompanying diagrammatic drawings, in which:

FIG. 1 is a circuit diagram illustrating the principle of the direct-current supply system used in the transmission system according to the invention, FIG. 2 is a diagram showing a repeater having separating filters and a by-pass circuit, FIG. 3 is a more detailed circuit diagram of a main station, and FIG. 4 is a circuit diagram of part of the main station shown in FIG. 3 to illustrate the operation of the means for suppressing the low-frequency cross-talk.

In these Figures, corresponding elements are designated by like reference numerals.

In the circuit diagram of FIG. 1 illustrating the principle of the direct-current supply system used in the system according to the invention two coaxial lines 1 and 1' each have an inner conductor 2 and 2' and an outer conductor 3 and 3' respectively. The coaxial lines form a signal transmission path between two main stations A and B and each include a plurality of repeaters 4 and 4' respectively. For supplying direct current to the repeaters included in the coaxial lines 1 and 1', in the main station A direct-current sources 5 and 6 are connected each to a coaxial line between the inner and outer conductors thereof, whilst in the main station B direct-current sources 7 and 8 are each connected to a coaxial line between the inner and outer conductors thereof. In each repeater the outer conductor of the line section preceding the amplifier and that of the line section succeeding the amplifier are interconnected, as FIG. 2 shows, by a line 9, whilst the repeater is provided with separating filters 10, 11 and 12, 13 which ensure that the high-frequency signals received via the coaxial line are applied to the amplifier and the supply direct current is combined after the amplifier with the amplified high-frequency signals via a by-pass circuit including a Zener diode 14. The supply direct current is derived from the voltage set up across the Zener diode 14.

In the direct-current supply system shown in FIG. 1 the substantially identical direct-current sources are connected with polarities such that the currents in the outer conductors 3 and 3' compensate for one another. Because the direct-current sources 5, 7 and 6, 8 respectively are connected in series via the coaxial lines 1 and 1' respectively, supply loop points are avoided and reliability is increased. In addition, the outer conductors 3 and 3' are connected to one another but not to earth so that the occurrence of interference voltages owing to lighting, power lines and electric traction lines are appreciably reduced.

FIG. 3 shows the connection of the main station A to the two coaxial lines 1 and 1' in more detail. The main station B is connected in the same manner to the other ends of the coaxial lines, however, as FIG. 1 shows, with a polarity of the current sources opposite to that of the current sources in the main station A.

The main stations are connected to earth, which means that the outer conductors of coaxial lines 15 and 15', which form the high-frequency signal output and the high-frequency signal input respectively of the main station A, are connected to earth. As an isolation of the non-earthed coaxial lines 1 and 1' from the earthed output and input 15 and 15' high-voltage capacitors 16, 17 and 16', 17', respectively are provided which are connected in series with the inner and outer conductors. The series capacitors 17 and 17' connected between the outer conductors replace the conventional high-frequency transformers with their conflicting requirements of low attenuation ( $\leq$ 0.5 dB) and high permissible voltage ( $\geq$ 3.5 kV, 50 Hz) between the primary and secondary windings. The main station A further includes the direct-current sources 5 and 6 which, similarly to what is shown in FIG. 1, are connected between the inner and outer conductors of the coaxial lines 1 and 1' respectively, however, with the interposition of high-frequency stop filters 18 and 18' respectively which each comprise series coils 19, 20 and 19' and 20' and a parallel capacitor 21 and 21' respectively.

Moreover the main station is provided with two low-frequency signal sources 22 and 22' which supply low-frequency control signals in the band of 15 to 20 kHz for remote control, supervision and/or protection of the transmission system.

According to the invention transmission of these low-frequency signals will be possible in a particularly simple and advantageous manner if the low-frequency signal sources 22, 22' provided in each main station are connected each to one of the supply current loops formed by the inner and outer conductors 2, 3 and 2', 3' of a coaxial line 1 and 1' respectively via connecting means 23 and 23' respectively which suppress the low-frequency cross-talk due to the transmission of the said low-frequency signals.

The supply current loops formed by the inner and outer conductors of each of the coaxial lines 1 and 1' are completely transparent to signal frequencies up to 200 kHz from main station to main station. Hence it is particularly attractive to transmit the low-frequency command and/or control signals which lie in the band of 15 to 20 kHz via these supply loops. However, is was found unexpectedly that this manner of transmission of the low-frequency signals gives rise to a high degree of low-frequency cross-talk.

Accurate investigations have further shown that this undesirable cross-talk is due to the high-voltage capacitors connected in the outer conductors to isolate the main stations from the coaxial lines. This is due to the fact that these high-voltage capacitors have been given the smallest possible values in order to limit their size. However, this means that these high-voltage capacitors have high impedances at low frequencies and that consequently the voltage produced across the capacitor 17 by the low-frequency signals from the low-frequency signal source 22 and the voltage produced across the capacitor 17' by the low-frequency signals from the low-frequency signal source 22' are not negligible and give rise to low-frequency cross-talk because the capacitors 17 and 17' are connected in parallel.

In the embodiment shown in FIG. 3 the low-frequency signal sources 22 and 22' are connected via transformers 24 and 24' in parallel with the direct-current supply sources 5 and 6 between the inner and outer conductors of the coaxial line 1 and 1' respectively. As a separation between the direct-current supply source 5, 6 and the low-frequency signal source 22, 22' a choke coil 25, 25' respectively which acts as a low-frequency stop is included in the line which connects the direct-current supply source 5, 6 via series coils 19, 20 and 19', 20' respectively of the high-frequency stop filter 18, 18' to the inner conductor 2, 2' of the coaxial line 1, 1' respectively, and also a capacitor 26, 26' is included in the line which connects the transformer 24, 24' via the series coils 19, 20 and 19', 20' respectively of the high-frequency stop filter 18 and 18' respectively to the inner conductor 2, 2' of the coaxial line 1, 1' respectively. In order to maintain the size of the said capacitor 26, 26' small, this capacitor 26, 26' forms part of a series resonance circuit 27, 27' tuned to the low-frequency signal frequency and having a series coil 28, 28' respectively.

The said means 23, 23' for suppressing the low-frequency cross-talk are included in lines 29, 29' which connect the direct-current supply sources 5, 6 and the transformers 24, 24' to the outer conductors 3, 3' of the coaxial lines 1, 1' respectively. More particularly the said means 23, 23' each comprise a series impedance 30, 30' consisting of the parallel combination of a resistor 31, 31' and a capacitor 32, 32' and a parallel impedance 33, 33' consisting of the series combination of a resistor 34, 34' and a capacitor 35, 35' connected to earth, respectively.

To explain the suppression of the low-frequency cross-talk provided by the said means 23, FIG. 4 shows the connection between the output coaxial line 15 of the main station and the coaxial line 1 and the connection of the low-frequency signal source 22 in a slightly different manner, elements required for this explanation being omitted for simplicity.

As the Figure shows, the addition of the series impedance 30 and the parallel impedance 33 provides a bridge circuit PQRS, the low-frequency signal source being connected between the points P and Q whereas the capacitor 17, which gave rise to the low-frequency cross-talk, is connected between the points R and S. If now the series impedance 30 is made equal to the impedance formed by the capacitor 21 in parallel with the impedance which exists between the inner and outer conductors of the coaxial line 1 and approximates to a resistor of about 75 ohms, and if further the parallel impedance 33 is made equal to the impedance formed by the capacitor 16 and the impedance which exists between the inner and outer conductors of the coaxial line 15 and approximates to a resistor of about 75 ohms, the low-frequency signal which is produced between the points P and Q does not result in a voltage difference between the points R and S so that no voltage is set up across the capacitor 17 and consequently the low-frequency cross-talk from the coaxial line 1 to the coaxial line 1' is avoided by neutralising the low-frequency signal circuit. The above discussion applies correspondingly to the other coaxial line 1', low-frequency cross-talk to the coaxial line 1 being avoided by the means 23'. Measurements have shown that the initial low-frequency cross-talk attenuation of about 60 dB is raised to about 120 dB using the steps according to the invention.

What is claimed is:

1. A main transmission station for use at the junction of a pair of ungrounded coaxial transmission cables having repeaters therein, and a pair of coaxial transmission cables having grounded outer shields said station comprising, a first capacitor means for coupling between the respective inner conductors of said grounded and ungrounded cables and a second capacitor means for coupling between the respective outer shields of said grounded and ungrounded cables, whereby low-frequency cross-talk can occur due to significant voltages developed across the capacitor means coupled to the outer shields of said ungrounded cables, a pair of direct current source means for supplying the repeaters in said ungrounded cables, a pair of high frequency stop filter means for coupling said source means to said ungrounded cables respectively, each of said filters having a parallel capacitor, a pair of low frequency signal sources, and a pair of means for coupling said low frequency sources to said ungrounded cables respectively, said coupling means each including bridge means for suppressing said cross-talk.

2. Transmission station as claimed in claim 1, wherein each of said means for suppressing the low-frequency cross-talk comprises the series combination of first and second impedances, said first impedance including the parallel combination of a resistor and a capacitor, said second impedance including the series combination of a resistor and a grounded capacitor, the outputs of said low-frequency sources each including a transformer respectively coupled to the junction point of the said first and second impedances, the other ends of the said first impedances are respectively coupled to the outer conductor of the ungrounded coaxial cables.

3. Transmission station as claimed in claim 2, wherein the resistors which form part of the said first and second impedances each are equal to the characteristic impedance of the ungrounded and grounded coaxial cables respectively, the capacitor which forms part of the first impedance is equal to the parallel capacitor of the respective high-frequency stop filter, and the capacitor which forms part of the said second impedance is equal to the capacitor coupled between the inner conductor of the respective grounded coaxial cable and the main station.

* * * * *